(12) United States Patent
Levitt et al.

(10) Patent No.: US 11,949,595 B2
(45) Date of Patent: Apr. 2, 2024

(54) REFLECTION ROUTING AS A FRAMEWORK FOR ADAPTIVE MODULAR LOAD BALANCING FOR MULTI-HIERARCHY NETWORK ON CHIPS

(71) Applicant: Intel Corporation, Santa Clara, CA (US)

(72) Inventors: Yonatan Meir Levitt, Brookline, MA (US); Gaspar Mora Porta, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 16/913,433

(22) Filed: Jun. 26, 2020

(65) Prior Publication Data

US 2020/0336424 A1    Oct. 22, 2020

(51) Int. Cl.
*H04L 12/743* (2013.01)
*H04L 12/46* (2006.01)
*H04L 12/747* (2013.01)
*H04L 45/00* (2022.01)
(Continued)

(52) U.S. Cl.
CPC ...... *H04L 45/7453* (2013.01); *H04L 12/4675* (2013.01); *H04L 45/34* (2013.01); *H04L 45/742* (2013.01)

(58) Field of Classification Search
CPC ....... H04L 45/74; H04L 69/22; H04L 45/745; H04L 45/7453; H04L 45/38; H04L 12/4675; H04L 45/34; H04L 45/742
See application file for complete search history.

(56) References Cited

U.S. PATENT DOCUMENTS

| | | |
|---|---|---|
| 5,583,990 A | 12/1996 | Birrittella et al. |
| 2002/0026511 A1* | 2/2002 | Garcia-Luna-Aceves ................. H04L 61/4553 711/E12.096 |

(Continued)

FOREIGN PATENT DOCUMENTS

| | | |
|---|---|---|
| WO | 2016099782 A1 | 6/2016 |
| WO | 2017052909 A1 | 3/2017 |

OTHER PUBLICATIONS

EPO; Extended European Search Report issued in EP Patent Application No. 20208334.1, dated May 18, 2021; 10 pages.

*Primary Examiner* — Atique Ahmed
(74) *Attorney, Agent, or Firm* — Alliance IP, LLC

(57) ABSTRACT

An apparatus includes a first set of processing element nodes, the first set of processing element nodes defining a first hierarchy of processing element nodes, the first set of processing element nodes comprising a source node, a first look-up table (LUT), and a first forwarder node, the source node to communicate with the first forwarder node by a first virtual channel. The apparatus includes a second set of processing element nodes, the second set of processing element nodes defining a second hierarchy of processing element nodes, the second set of processing element nodes comprising a second forwarder node, a second LUT, the second LUT comprising an indication of a direction of the first forwarder node in the first hierarchy, and a target node logically coupled to the second forwarder node by the first virtual channel. The first LUT comprises a direction of the second forwarder node in the second hierarchy.

20 Claims, 11 Drawing Sheets

(51) Int. Cl.
*H04L 45/74* (2022.01)
*H04L 45/7453* (2022.01)

(56) References Cited

U.S. PATENT DOCUMENTS

| | | | | |
|---|---|---|---|---|
| 2002/0114276 | A1* | 8/2002 | Basturk | H04L 45/245 |
| | | | | 370/230 |
| 2003/0200307 | A1* | 10/2003 | Raju | H04L 61/00 |
| | | | | 709/224 |
| 2004/0054807 | A1* | 3/2004 | Harvey | H04L 12/56 |
| | | | | 709/239 |
| 2005/0286543 | A1* | 12/2005 | Coppola | H04L 12/42 |
| | | | | 370/403 |
| 2006/0193333 | A1* | 8/2006 | Baughan | H04L 45/46 |
| | | | | 370/400 |
| 2007/0286097 | A1* | 12/2007 | Davies | H04L 45/02 |
| | | | | 370/255 |
| 2010/0125779 | A1* | 5/2010 | Choudhury | G06F 16/248 |
| | | | | 707/E17.001 |
| 2013/0058208 | A1* | 3/2013 | Pfaff | H04L 61/5007 |
| | | | | 370/217 |
| 2014/0254388 | A1 | 9/2014 | Kumar et al. | |
| 2016/0182393 | A1* | 6/2016 | Chen | H04L 47/625 |
| | | | | 370/412 |
| 2017/0075838 | A1* | 3/2017 | Nooney | H04L 49/1515 |
| 2017/0091108 | A1* | 3/2017 | Arellano | G06F 13/4282 |
| 2018/0145900 | A1* | 5/2018 | Zdornov | H04L 45/24 |
| 2018/0167307 | A1* | 6/2018 | Barry | H04L 45/7452 |
| 2018/0367388 | A1* | 12/2018 | Pani | H04L 41/0895 |
| 2019/0104062 | A1* | 4/2019 | Taylor | H04L 45/74 |
| 2019/0296922 | A1* | 9/2019 | Dutta | H04L 12/1886 |
| 2019/0319789 | A1* | 10/2019 | Chhabra | H04L 9/088 |

* cited by examiner

REFLECTION ROUTING AS A FRAMEWORK FOR ADAPTIVE MODULAR LOAD BALANCING FOR MULTI-HIERARCHY NETWORK ON CHIPS

STATEMENT OF GOVERNMENT INTEREST

This invention was made with Government support under Agreement No. H98230-13-D-0124 awarded by the United States Department of Defense. The Government has certain rights in the invention.

BACKGROUND

Advances in semi-conductor processing and logic design have permitted an increase in the amount of logic that may be present on integrated circuit devices. Computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

Figure 1:
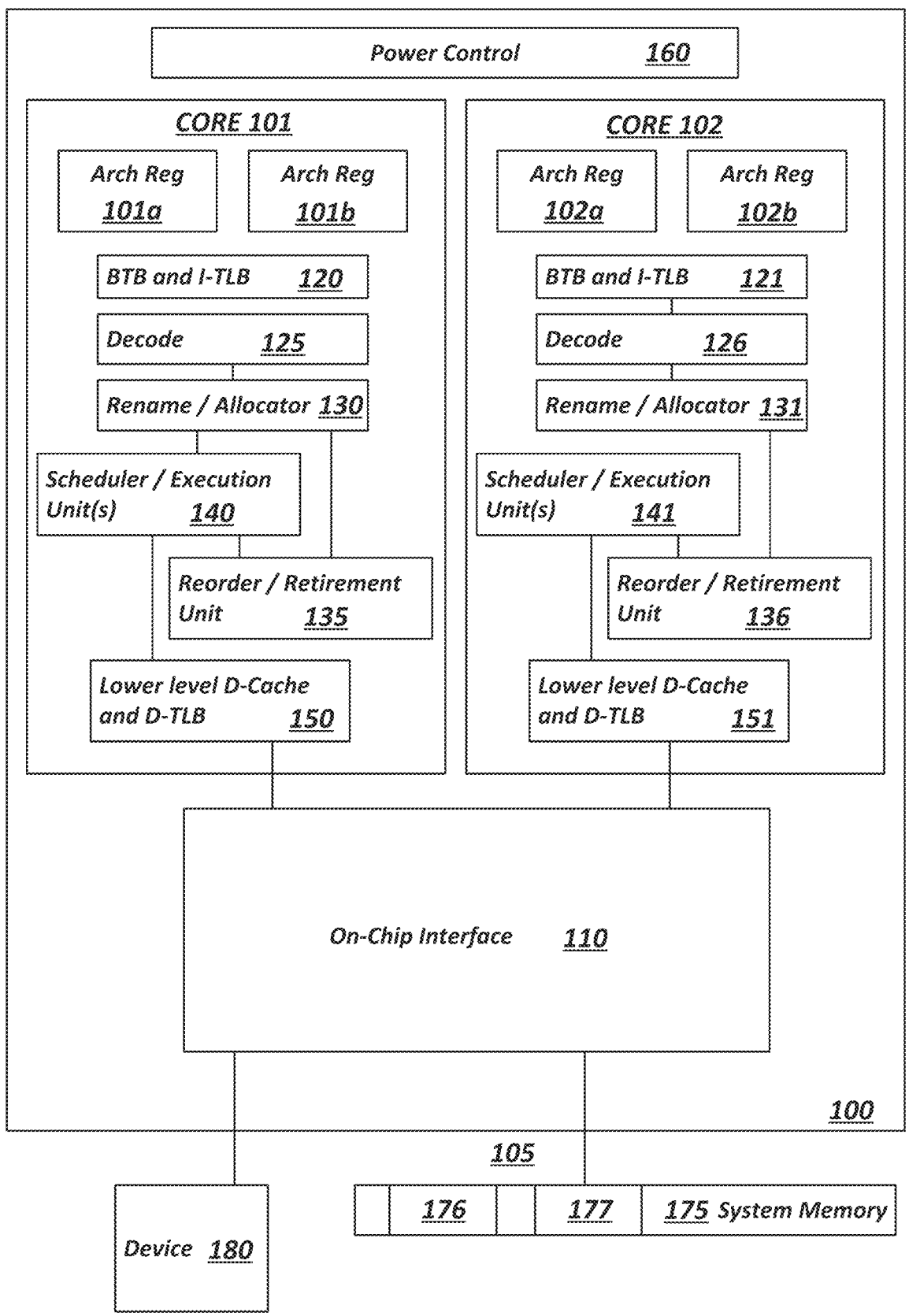
FIG. 1 illustrates an embodiment of a block diagram for a computing system including a multicore processor in accordance with embodiments of the present disclosure.

Figure are not drawn to scale.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores, memory elements, memory controllers, agents, or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 151, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or includes an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example, in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The number of cores included and used on a single server chip has grown. The basic technologies associated to On-Die Interconnects (ODI) are experiencing growing pains with the need to support more and more agents. Throughput demands of the ODI have also grown, fueled by the advent of high bandwidth agents (HBAs), such as High Bandwidth Memory (HBM) or new evolutions of the PCIe specification.

The increase in the number of cores supporting a server or application has resulted in the development of tangential technologies, many of which present their own challenges. For example, multi-chip packages (MCP) are being adopted. An MCP uses an off-die interconnect that is either lower on throughput or higher in power. In another example, routing Look Up Tables (LUTs), previously encapsulating all destinations for every source, can no longer scale efficiently for both timing and area criteria. The growth in core numbers has also resulted in increased demand for hierarchical clustering techniques to partition the chip to reduce long credit loops, as well as to reduce the coherent domain requirements.

HBAs also can introduce bottlenecks as traditionally HBAs have been placed at the edges of the chips for a variety of reasons. This placement, while ideal for other reasons, suffer from bandwidth problems introduced either by the chosen routing algorithm, or simply due to placement in a given topology. The HBAs can affect adjacent cores or clusters based on the fact that overlapping traffic from other clusters and cores can give unfair bandwidth distribution for these shared entities.

This disclosure describes a bounded hierarchical solution that is both modular and scales with continued core growth. The techniques described herein provide a balanced approach to throughput distribution both across die-to-die connections, as well as optimizing for HBAs.

This disclosure describes on-die and die-to-die routing between processing elements, such as between a source node and a target node. In general, a node can be a processing element, resource, memory element, processing core, memory controller, router, or other type of on-side hardware element. A die or a chip can include many processing elements spread out across the die. This disclosure describes partitioning clusters of nodes into hierarchies. A hierarchy can be described as a self-contained, non-overlapping cluster of nodes. Hierarchies can be virtually constructed or physically constructed. A physically constructed hierarchy can include resources that are clustered together physically on a die. Virtual or logical hierarchies can be constructed based on a variety of factors, such as the type of resource, address space, previously routing characteristics, telemetry, routing speeds, etc. Hierarchies can be modular, and can scale based on usage characteristics, demand, etc., by adding or subtracting hierarchies. Hierarchies can be defined in multiple dimensions, such as a two dimensional hierarchy or a three dimensional hierarchy.

This disclosure also describes a routing technique based on the concept of "Node Reflection." The term "Node Reflection" is used herein to describe a view of the entire system node ID space. Node reflection can be used to route information between hierarchies from a source node in a source hierarchy to a target node in a target hierarchy (in some cases, through intermediate hierarchies), where the source hierarchy is different from the target hierarchy. A reflection network is a set of interconnected forwarder nodes, wherein each forwarder node in the set resides within its own hierarchy and each forwarder node having an equivalent forwarder node within each of the other hierarchies. The term "reflection node" describes each node in a reflection network.

The reflection network of forwarder nodes allows for smaller and simpler LUTs at each reflection node. The reflection network also provides adaptability as well as load balancing with goal of ideal distribution across hierarchical boundaries. This disclosure describes a framework for making an adaptable load balanced network based, in some embodiments, on dimension order routing (DOR) that can scale as a number of nodes increases in a system with bounded LUT sizes.

The framework described herein can make use of two types of LUTs:

A first type of LUT is a source LUT, such as an indirection LUT, that can be stored locally with the source node. This source LUT contains a mapping of a set of fields to a destination (or destination address) in a same hierarchy as the source node. The source LUT destination for reflection network routing is to a forwarder node within the same hierarchy as the source node. The term local can be used herein to describe nodes that are within the same virtual, logical, or physical hierarchy. The term "non-local" or "remote" can be used to describe nodes in a different hierarchy. For example, a source node can send information to a local forwarder node (in a first hierarchy) that is destined for a non-local or remote target node (in a second hierarchy). The mapping used for the source LUT can be selected or determined to optimize the load balancing, described more below.

A second type of indirection LUT is a "reflection" LUT. The reflection LUT is stored with the forwarder node, which has another indirection LUT specifying a single "reflected" node in each adjacent hierarchy. The forwarder forwards data to the next forwarder in an adjacent hierarchy based on determining the optimal direction using the reflection LUT. The data is forwarded using the reflection network until the data reaches a forwarder in the target hierarchy.

Once the data reaches the target hierarchy, local routing mechanisms can be used to direct the packet to the target node, such as using dimension order routing or other implementation choices.

The following are example implementation choices for formatting for the LUTs:

On-die Interconnect (ODI) ID can be defined to include the following information (in a format that is implementation specific):

ODI ID={HierID, local Column, local Row}

A packet header can include:

Hdr={Actual Target ODI ID; Indirection ODI ID}.

The ODI ID can use a Mesh ID or other type of identification formatting.

The source LUT (also called an initiator LUT or initiator indirection LUT) translates a target address, or a set of fields from the packet, into a local forwarder address, e.g., using a hashing algorithm. The max number of entries in this LUT is the maximum hierarchical cluster size (or the max number of legal forwarders in a hierarchy). The width of the table entry will be the ODI node ID width without the hierarchy added. These fields, which can include the actual target, is hashed or transformed to address the indirection LUT by the node that is performing the forwarding. Table 1 illustrates an example indirection LUT format:

TABLE 1

Indirection LUT format.

| Hash Value | Local Target |
|---|---|
| <0> | <col><row> |
| <1> | <col><row> |

TABLE 1-continued

Indirection LUT format.

| Hash Value | Local Target |
|---|---|
| <2> | <col><row> |
| <3> | <col><row> |

The reflection LUT presents forwarder nodes that are the reflection node in the hierarchies adjacent to the local hierarchy. The maximum size for this is 4 entries for a 2-dimensional hierarchy structure (6 entries for a 3-dimensional hierarchy structure), with ODI node ID width. For symmetrical hierarchical clustering this can be reduced to only the hierarchy id bits with the row and column bits implied as the same as the local one. Table 3 illustrates an example reflection LUT format:

TABLE 2

Reflection LUT format.

| | N | S | E | W |
|---|---|---|---|---|
| Reflector | <hid><br><col><row> | <hid><br><col><row> | <hid><br><col><row> | <hid><br><col><row> |

When the data reaches a forwarder that is a part of a same hierarchy as the target node or destination node, the forwarder routes the data to the target node using a local routing technique.

This framework allows for scaling to any number of cores by defining an achievable number in all hierarchies. LUT sizing is constrained to the number of forwarders in the local hierarchy. With the use of solely DOR for routing locally and between routers, this framework is deadlock free with only 2-3 nodes or virtual computers (VCs) depending on the flexibility required by the reflection configuration. In addition, balancing local and non-local traffic may happen through arbitration of transitions from one node to another (e.g., VC1/2 ->VC0). Empirical results show that on a given topology, 1.7× memory bandwidth can be achieved for some flows.

Figure 2:
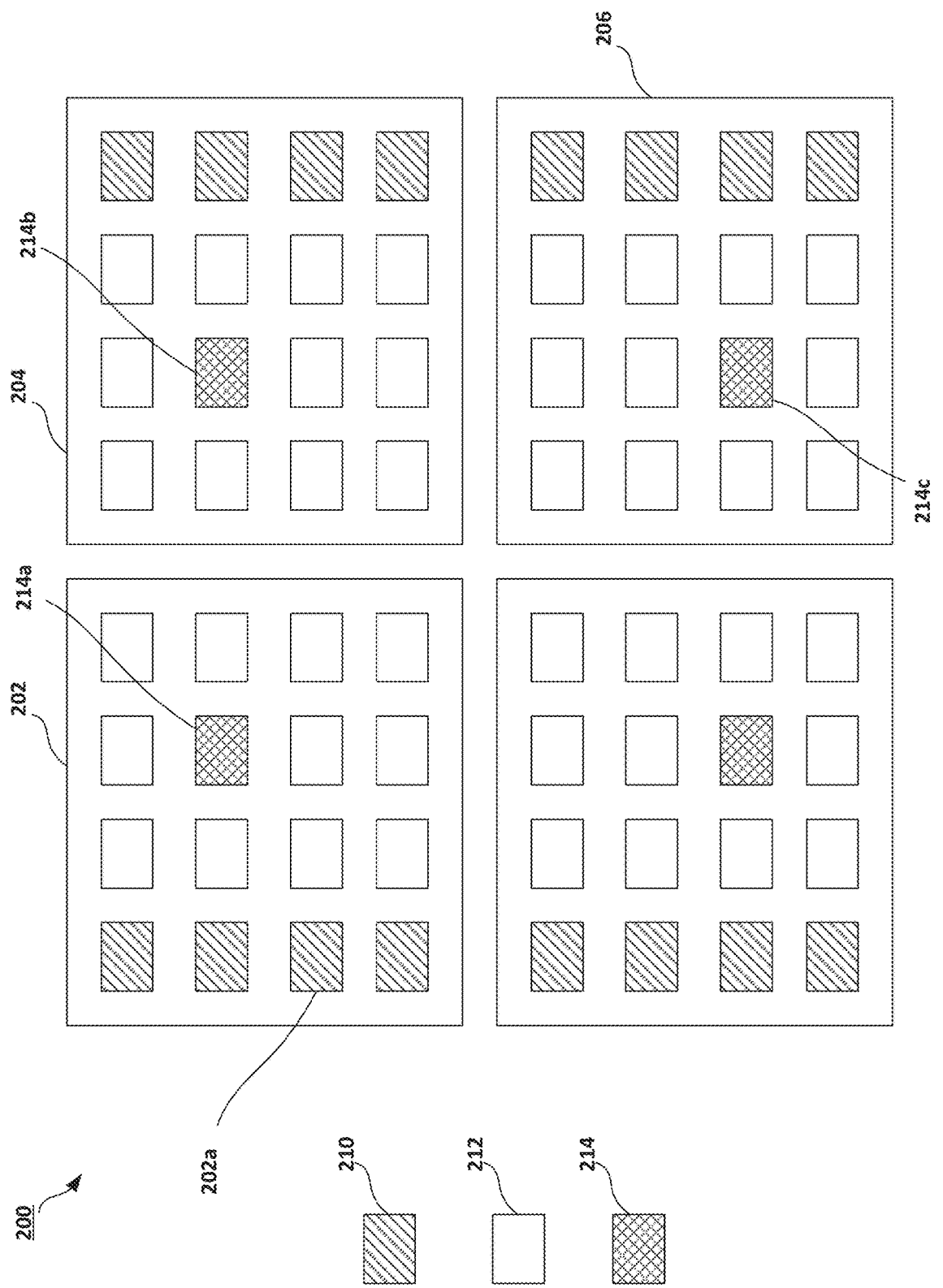
FIG. 2 is a schematic diagrams of an example reflection routing framework in accordance with embodiments of the present disclosure.

FIG. 2 is a schematic diagram of an example reflection routing framework 200 in accordance with embodiments of the present disclosure. The SoC topology 200 shown in FIG. 2 illustrates a symmetrically partitioned SoC that includes four hierarchies 202, 204, 206, and 208. Each hierarchy includes a plurality of hardware processing elements (also referred to as processing element nodes or simply as nodes). Hardware processing elements can include hardware processing circuitry, transistors, semiconductor fabricated components, analog circuit elements, digital logic elements, memory elements, processor cores, routers, forwarders, etc. In some embodiments, forwarders are logical elements that forward data into and through and out of the reflected network, the forwarders can be routers that use reflection LUTs.

The hierarchies can include a single type of hardware processing element or can include various types of hardware processing elements. In the examples of FIG. 2, each hierarchy 202-208 can include a non-distributed scarce source node 210, a distributed source node 212, and a reflection node 214. Source nodes can be sources of message requests and/or responses, targets of message requests and/or responses, sources of data, memory elements for storing information, etc.

For example, in FIG. 2, the first hierarchy 202 includes a source node 202a and a router 214a. A second hierarchy 204 includes a router 214b, which is a reflection node corresponding to router 214a. Likewise, a third hierarchy 206 includes a router 214c, which is a reflection of router 214b. The positions of the reflection nodes can be kept in a reflection LUT local to each router that makes up the reflection network. The reflection LUT is described more below.

Not all nodes in a given hierarchy must be reflectable, however all reflectable nodes must be represented in all hierarchies. As such all reflectable nodes have a North, South, East, and West (i.e., cardinal direction) equivalent (when such hierarchies exist), so that all hierarchies can infer where in the destination they will land based on the local reflection. In the example shown in FIG. 2, router 214a has an East equivalent in the reflection network, which is router 214b (and vice versa: router 214b has a West equivalent, which is 214a). Likewise, router 214b has a South equivalent in the reflection network, which is 214c (and vice versa: router 214c has a North equivalent, which is 214b).

In symmetrical topologies, such as that shown in FIG. 2, the reflection nodes can occupy the same row/column in their respective hierarchies as the first node. The reflection nodes can occupy reflected rows/columns in their respective hierarchies as the first node, which is shown in FIG. 2. The reflection node locations can be selected for optimization for load reduction, latency, and area requirements. In non-symmetrical topologies, a subset of nodes in a cluster can be defined as reflection nodes and used to interpret the destination.

For a reflected network, packets, whether they are request, response, or acknowledge packets, have two possible destinations as far as a source is concerned. A packet is either a local hierarchy packet or a remote Hierarchy packet. A local hierarchy packet is destined for a target node within the same hierarchy as the source node or a forwarder or router node. A local hierarchy packet is routed locally using dimension order routing (DOR).

A remote hierarchy packet is bound to cross a hierarchical border, such as a die crossing. For a remote hierarchy packet, the packet should be forwarded to the "remote" hierarchy or network by DOR, but using a series of intermediate router or forwarder nodes that are "reflected" across all hierarchies. Once a packet reaches its destination hierarchy, the packet then queues itself back to the local routing virtual channel (VC) network and completes its trip with DOR to the target destination.

Figure 3:
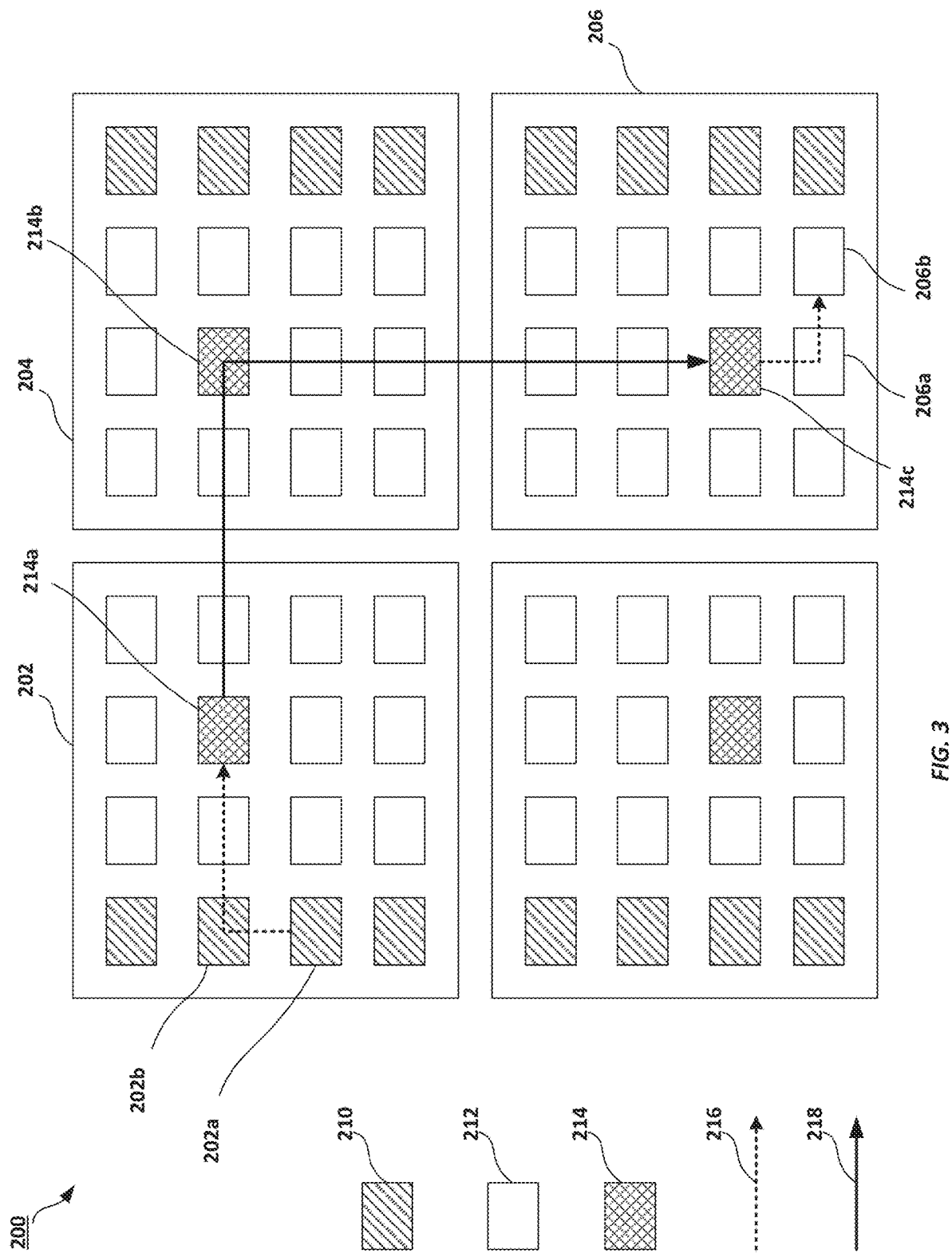
FIG. 3 is a schematic diagram illustrating an example packet flow through a reflected network in accordance with embodiments of the present disclosure.

An example packet routing through the reflected network is shown in FIG. 3. FIG. 3 is a schematic diagram illustrating an example packet flow through a reflected network in accordance with embodiments of the present disclosure. A source node 202a can originate a packet destined for a target node 206b. Source node 202a resides in hierarchy A 202. The source node 202a can identify a first hop to a forwarder node 202b (which can be another source node or some other processing element). The source node 202a can identify the first hop based on an indirection look-up table (LUT) or other ways for determining the routing for the packet. The forwarder node 202b can then determine a next hop to a first forwarder node 214a. Source node 202a, forwarder node 202b, and first forwarder node 214a are all within the hierarchy A 202. The packet is transmitted between nodes within the same hierarchy by a first virtual channel (VC0).

The router node 214a can then use a locally stored reflection LUT to identify a corresponding reflection node 214b in another hierarchy (e.g., hierarchy B 204) and identify the cardinal direction for the reflection node 214b. The reflection node 214b can use a locally stored reflection LUT to identify the reflection node in hierarchy C 206. The routing to the "remote" network is in effect routing to a local endpoint with DOR. Routing between reflection nodes can also be done with the same DOR, however this is not a requirement. This routing scheme with DOR can be implemented with 3 Virtual channels:

VC0 will be used for all local routing.

VC1 will be used for cross hierarchy routing, and VC2 is for use of possible deadlocking on the "Reflected" network, however this can be reduced if the row or the column is kept constant.

The router node 214c can then determine that the packet is destined for a target node within the same hierarchy (hierarchy C 206). The router 214c can then send the packet to a local next hop node 206a and then on to the target node 206b.

Figure 4:
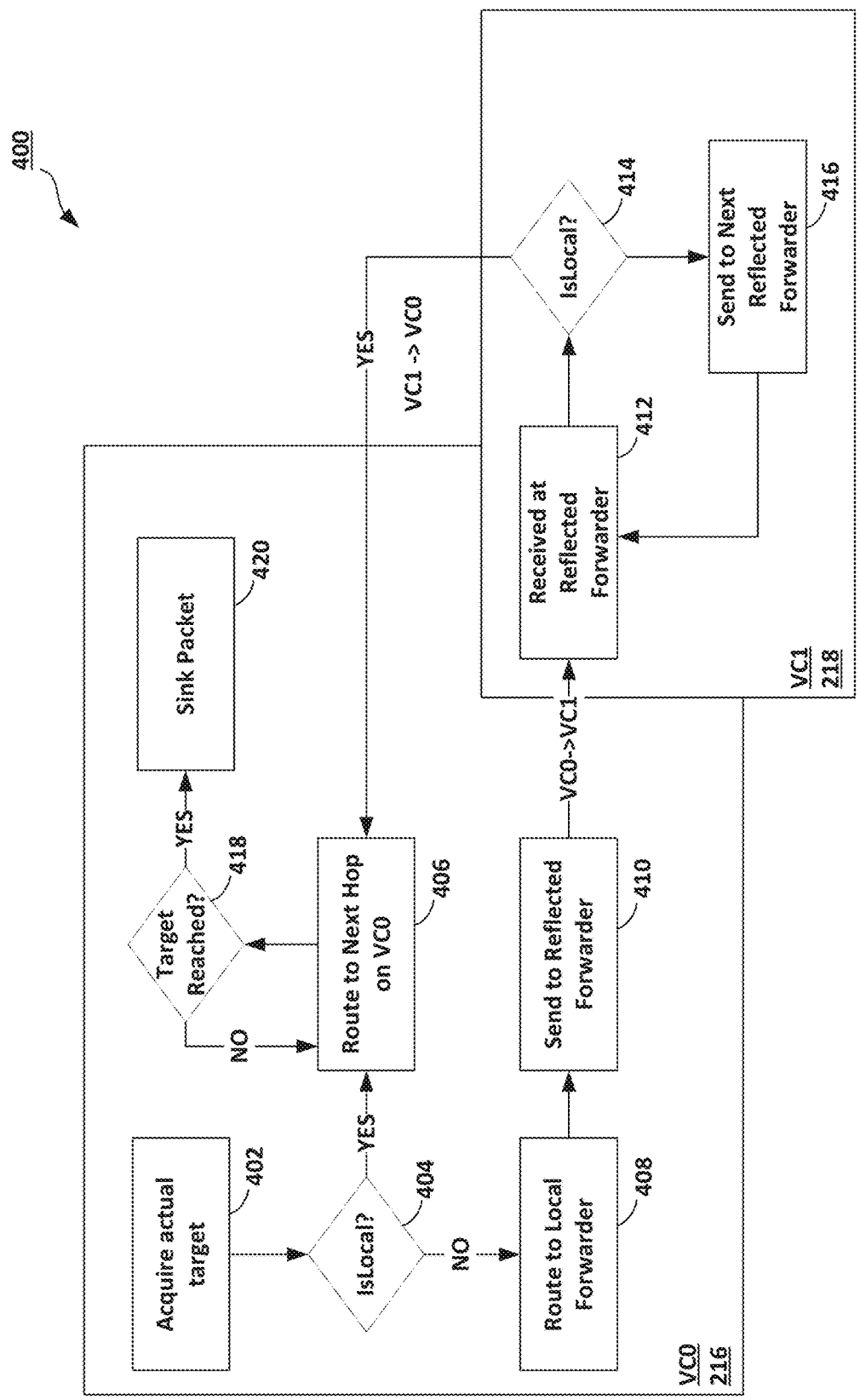
FIG. 4 is a schematic diagram illustrating a process flow for routing packets through the reflected network in accordance with embodiments of the present disclosure

FIG. 4 is a schematic diagram illustrating a process flow 400 for routing packets through the reflected network in accordance with embodiments of the present disclosure. The process flow can use information from the packet header (or create the packet header to include information) used for routing the packet. For example, the packet header can include fields for the Actual Target ODI ID and the Indirection ODI ID, along with other information used for routing and packet processing. The ODI ID is a structure that includes a hierarchy ID, a local column, and a local row. For example:

ODI ID={HierID, Local Column, Local Row}.

Other examples of a packet header information structure can be used without deviating from the scope of the disclosure. For example, a MeshID can also be used.

The process flow 400 provides a logical process flow within each virtual channel for the routing of a packet between a source node and a target node. A source node can acquire an actual target, either from a request, a packet field, or from a LUT or other source of information (402). The source can first determine whether the target is local (meaning that the target is within the same hierarchy as the source) (404). For example, packet header can include a hierarchy identifier for the destination, and if the hierarchy identifier is the same as the source hierarch identifier, then the packet is destined for a local target. If the hierarchies are different, then the packet is destined for a non-local or remote target.

If the packet is destined for a local packet, then the source node can send the packet to a next hop using VC0 216 (406). The source can use the indirection ID for the actual target ID for next hop forwarding (e.g., to another node within the same hierarchy on VC0).

If the packet is not destined for a local target node, then the packet can be routed to a local forwarder node (408) and/or on to a reflected forwarder (410). In some embodiments, the local forwarder can be the same as the reflected forwarder; but in some implementations, the packet has to be routed to the reflected forwarder through intermediate hops (as depicted in the example shown in FIG. 3). As mentioned before, the local forwarding (i.e., forwarding within the same hierarchy) is performed on a first VC (e.g., VC0 216). A reflected forwarder can be a node that is part of a reflection network.

The reflected forwarder in the first hierarchy can use a reflection LUT to identify a corresponding reflection router in an adjacent hierarchy. The reflection LUT can include the cardinal direction for the reflection router as well as a column and row assignment for that reflection router. The router can then forward the packet using a second VC (e.g., VC1 218 or VC2 to avoid deadlock) to the reflected router in the second hierarchy (410).

The reflected router can receive the packet (412). At the reflected router, the reflected router can then determine whether the packet is for a local target node (414). If the target is local (i.e., based on the hierarchy ID), then the reflected router can route the packet to the next hop on VC0 (406). If the target is reached (418), the target node can sink the packet (420).

If the reflected router determines that the packet is not destined for a local target node, the reflected router can identify another reflected router in another hierarchy (416). The cycle can continue until the packet reaches the target node.

```
Example pseudocode can include:
  At the source :
  If request :
     ActualTargetID = request.SourceID
  Else:
     ActualTargetID = getTarget(address)
  isLocal = actualTarget[hierID] == myHierID
  If isLocal:
        IndirectionID = ActualTargetID
        Send to router based on VC0
  else:
        IndirectionID = IndirectionLUT[transform(ActualTargetID)]
        Send to router based on indirection ID on VC0 //transition to vc1
at
the router//
  At the router:
  If actualID == myID :
     Sink packet
  else If indirectionID == myID :
     Islocal = (indirection[HierID] == myID[HeirID])
     If islocal:
        indirectionID = actualID
        forward to next stop on VC0
     else:
        indirectionID = reflectionLUT[getDirection(Indirection[HierID])]
        forward to next stop on VC1
  else:
     continue forwarding on to next router in same VC as the input.
```

The source indirection LUT can be accessed through using a hashing algorithm with a variety of packet fields such as target ODI node id, memory address, or others. In addition, using the same target multiple times in the table can allow for biasing the traffic to a specific location, more than other targets.

Load balancing can be considered in two ways: The load balancing needs to be biased to load balance at the source; the load balancing needs to be biased to be balanced at the destination.

Source biasing: mainly used when the source is an HBA, where the main bottlenecks are in the beginning of the flow.

Destination biasing: mainly used when the source is already a highly distributed node such as a core and as such the load balancing should occur based on the destination requirements With the load balancing there are also a few different options:

Single path based only on reflection: The lowest cost implementation can be where all hierarchies are symmetrical. In this case a distributed source such as a core or caching agent can route directly to its reflection node on another die. Then from there it will be forwarded to the target. This does not load balance at the destination but due to the distributed nature of the source it does effectively load balance the hierarchy boundaries. In a non-distributed source, such as a memory controller or other scarce resource this can be done by selecting the distributed destination and using back reflection to determine the local representative. The hardware costs for this are only in the reflection LUTS in the forwarding resources. That being said there is a forwarding resource in every point on the distributed agents.

Single path based on LUTs: This can be done on symmetrical or non-symmetrical hierarchies. In this case the first forwarder is always chosen based on a LUT lookup. This allows for the load balancing to be achieved both at the Hierarchical borders as well as either source/destination, based on the initiator type. A distributed source will be based it on load balancing at the destination, while a scarce resource will load balance at the source. this is also adaptable as it can be reprogrammed Multiple paths based on pseudo-random hashing and LUT: This is done with the ideal path diversity possible in mind. Once a target is acquired the target ID is hashed and reduced to the target path diversity size. The maximum diversity is equal to the maximum number of local forwarding agents (local to the source). the table for routing is the length of the path diversity as it translates hash value->local target ID. Full implementation of this is to do it at all of the locations with full path diversity. Alternatively, this can be reduced for distributed agents to a small number. This allows for full load balancing both across Hierarchy cross sections as well as at the source and destination. There is no requirement here for symmetry. Table 3 below illustrates attributes for each type of path:

workload, the predominant serialization issues are on the data response network. In YX this would cause catastrophic serialization on the edge columns and as such greatly limit the throughput. In this case the best load balancing will be for responses to distribute horizontally based on source biased load balancing, whereas the request network should distribute horizontally based on the destination biased load balancing.

Figure 5:
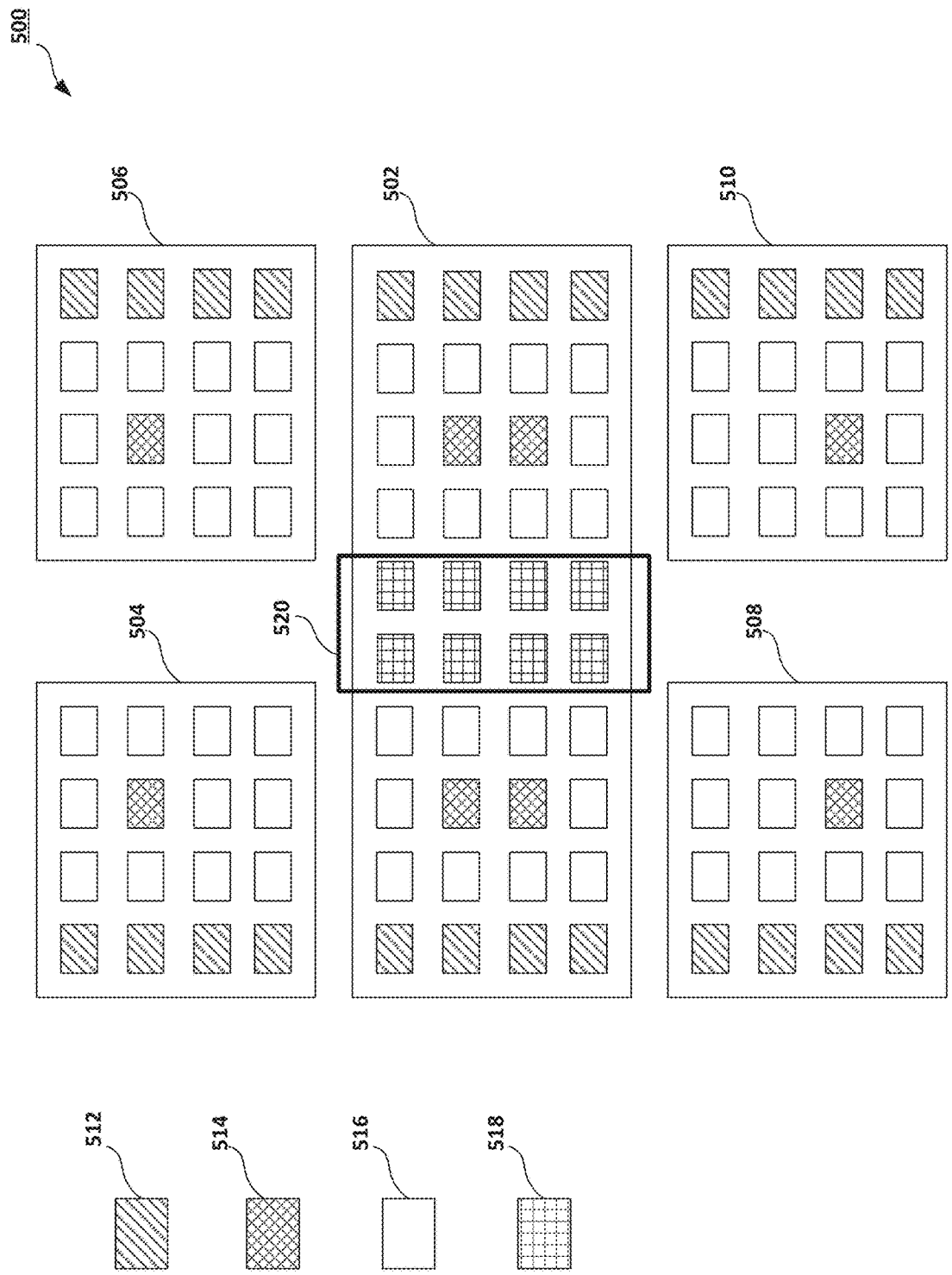
FIG. 5 is a schematic diagram of an example topology in accordance with embodiments of the present disclosure.

FIG. 5 is a schematic diagram of an example topology 500 in accordance with embodiments of the present disclosure. In the topology 500, a central hub 502 can separate four clusters of processing elements 504, 506, 508, and 510. A virtualized boundary 520 can be formed that includes elements 518 so that the central hub 502 can be considered to include a cluster of processing elements similar to clusters 504-510. The elements 518 can be not used for routing or can be used for other purposes. Once the clusters are formed, the topology 500 resembles a symmetric topology, similar to that shown in FIG. 2.

Figure 6:
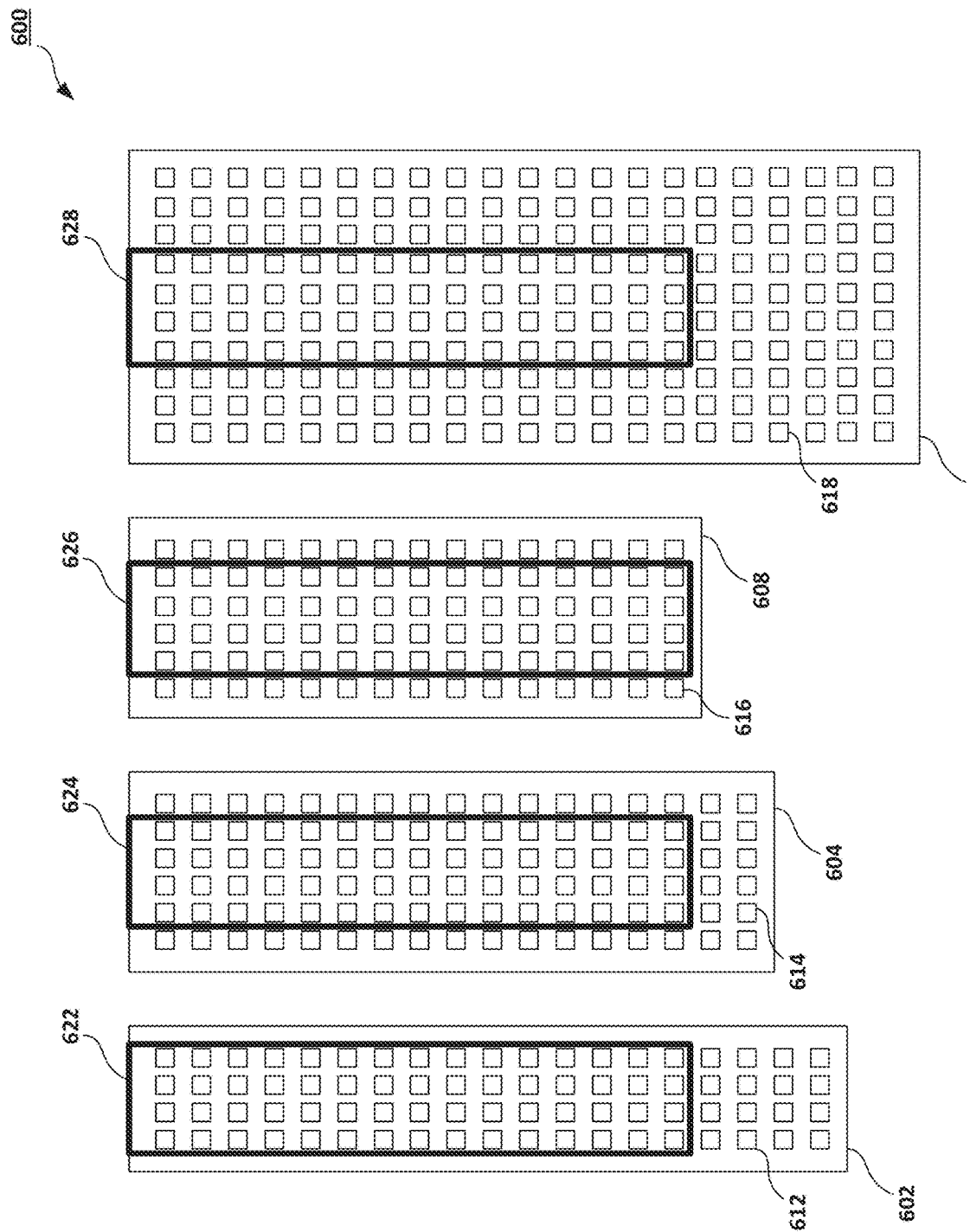
FIG. 6 is a schematic diagram of an example topology that is not symmetric in accordance with embodiments of the present disclosure.

FIG. 6 is a schematic diagram of an example topology 600 that is not symmetric in accordance with embodiments of the present disclosure. Topology 600 includes chips 602, 604, 608, and 610, each being a different size, shape, and having a different total number of hardware processing elements 612, 614, 616, and 618, respectively. In certain implementations, the chips or dies can have different sizes, layouts, configurations, clusters, numbers of processing elements, etc. The topology 600 of FIG. 6 is one example of such a

TABLE 3

|  | Diversity | HW requirements | Load balanced |
| --- | --- | --- | --- |
| Single Path between all pairs based only on reflection | Same as DOR | Low | Same as DOR at source and destination, but load balanced across the heir cross section |
| Single Path between all pairs based on LUT | Same as DOR | Low | 1.1x better throughput on some flows |
| Multiple paths based on LUT + pseudo random hashing | Up to number of local forwarders at the source | Medium (based on path diversity requirements) | 1.3x-1.7x better throughput on some flows on a given hierarchy |

The placing of forwarding agents can be in any place in the hierarchy however it must not be at the hierarchy boundaries to the exclusion of others. If this is the case the resulting load balancing will cause catastrophic serialization at the hierarchical borders.

Adaption Flow:

The indirection LUTs can be reconfigured on the fly based on a flow similar to changing a clock on the interconnect: Quiesce packets, reconfigure, allow packets to continue. This reconfiguration can be done based on wholesale statistics collection. One example of this may be to change the load balancing based on collection of read and write statistics at the scarce resources. Quiescing the packets may be necessary due to the need to maintain ordering.

Another possible flow can be to allow for the sources to reconfigure the LUTs on the fly based on locally collected statistics. There may be reordering issue with this as well as possible time needed for contention to settle in the flows. In this flow either the target would be responsible for reordering or the source would need to detect possible conflicts and only allow for reconfiguration when allowable.

An example of the need to reconfigure can be conceptualized when the memory controllers are situated at the horizontal edges of the dies, and the routing algorithm used is YX. In the case when there is a high read bias in the topology. For example, one entire cluster can include all memory elements for ease of addressing and faster response times. To implement the reflection network within an asymmetric topology, sub-clusters of processing elements 622, 624, 626, and 628 can be designated to be part of the reflection network. The sub-clusters 622-628 can be the same configuration between each chip. By defining subsets of nodes to be reflectable, the reflection network begins to resemble a symmetric topology to the extent that the reflection LUT can still rely on DOR for remote forwarding.

Figure 7:
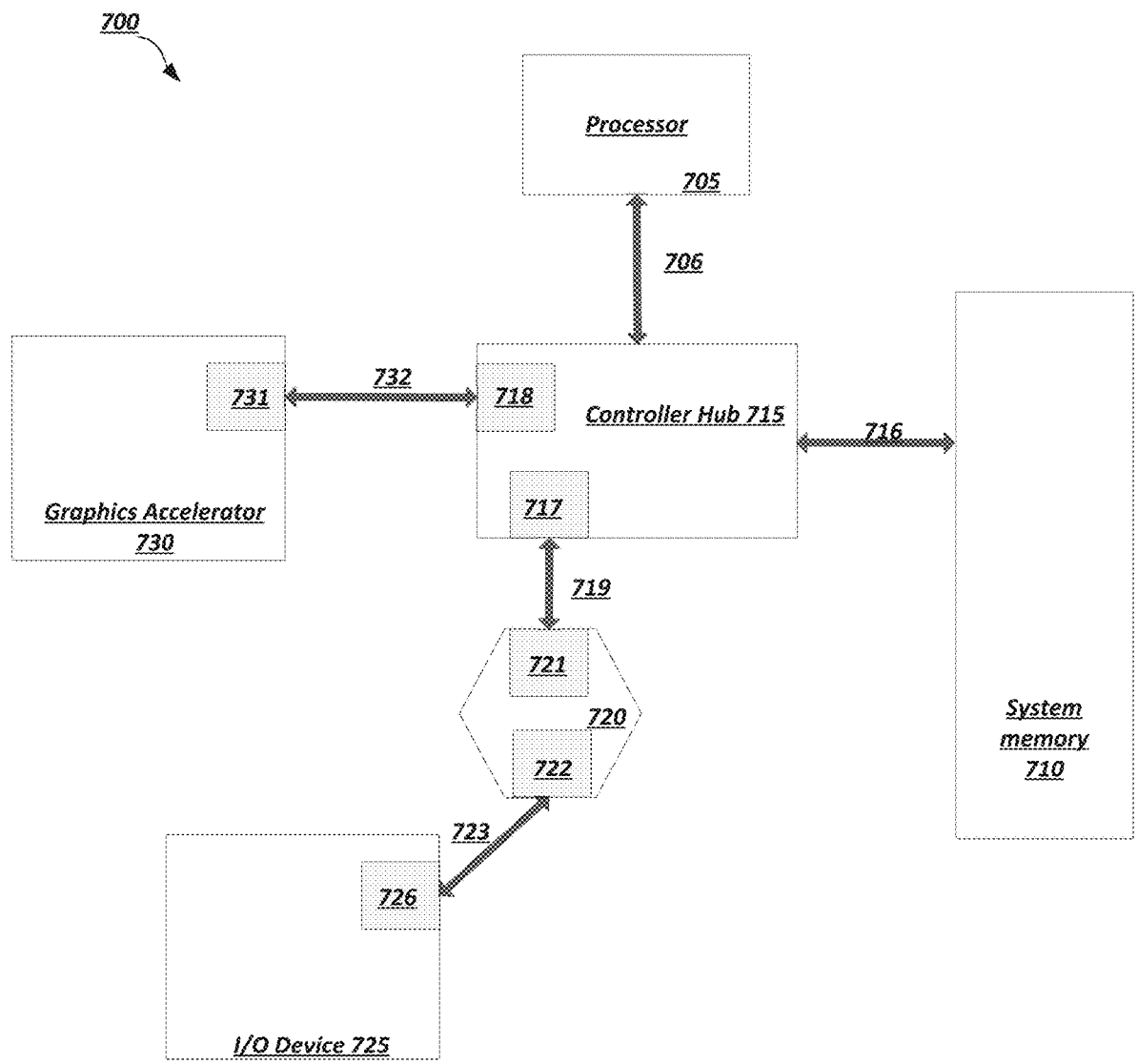
FIG. 7 illustrates an embodiment of a computing system including an interconnect architecture.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root port controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
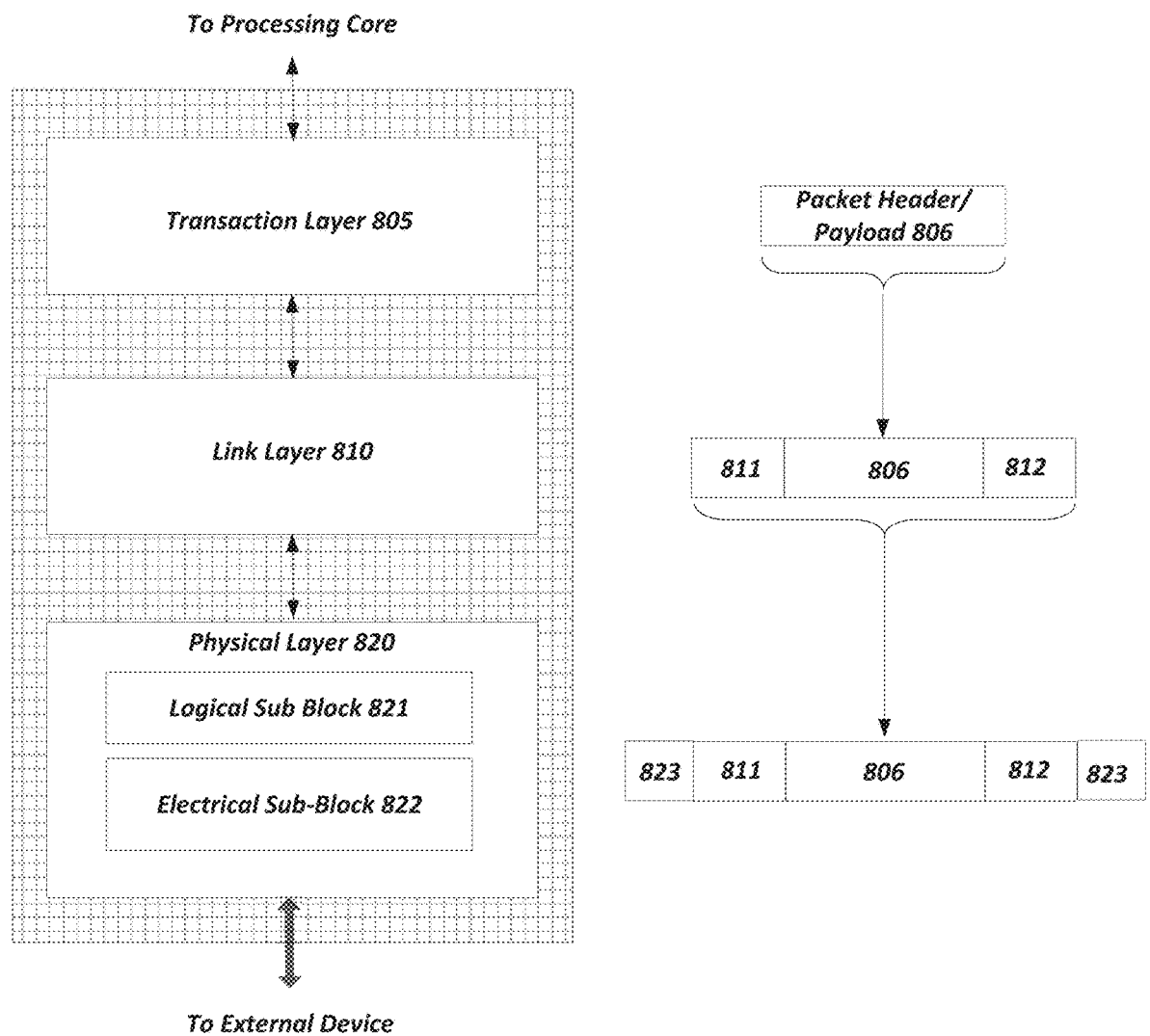
FIG. 8 illustrates an embodiment of an interconnect architecture including a layered stack.

Turning to FIG. 8 an embodiment of a layered protocol stack is illustrated. Layered protocol stack 800 includes any form of a layered communication stack, such as a Quick Path Interconnect (QPI) stack, a PCIe stack, a next generation high performance computing interconnect stack, or other layered stack. Although the discussion immediately below in reference to FIGS. 7-10 are in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 9:
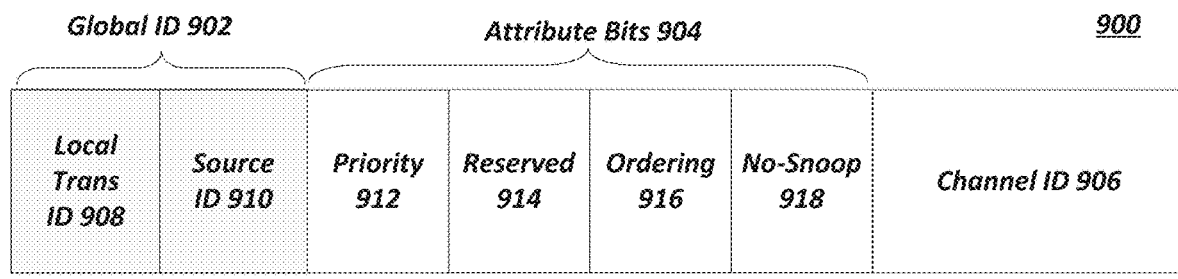
FIG. 9 illustrates an embodiment of a request or packet to be generated or received within an interconnect architecture.

Quickly referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904, and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 918 is utilized to determine if transactions are snooped. As shown, channel ID Field 906 identifies a channel that a transaction is associated with.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8b/10b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 10:
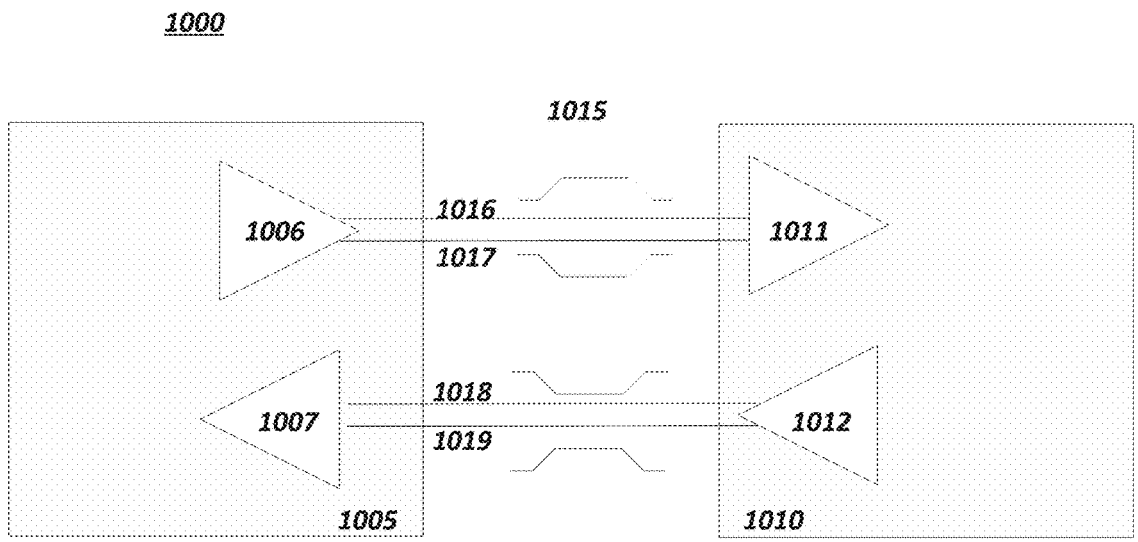
FIG. 10 illustrates an embodiment of a transmitter and receiver pair for an interconnect architecture.

Referring next to FIG. 10, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1016 and 1017, to transmit differential signals. As an example, when line 1016 toggles from a low voltage level to a high voltage level, i.e. a rising edge, line 1017 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 11:
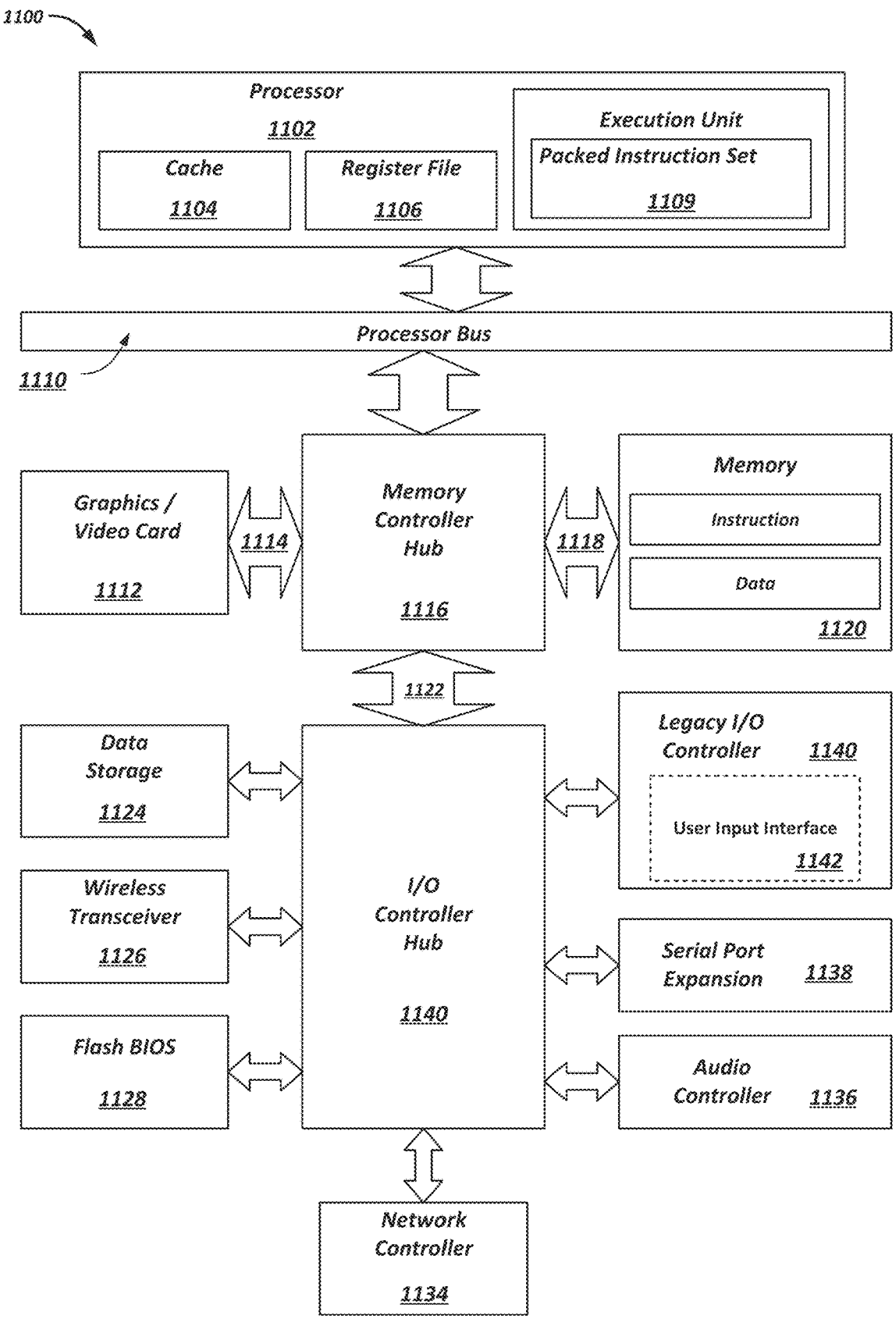
FIG. 11 illustrates another embodiment of a block diagram for a computing system including a processor.

Turning to FIG. 11, a block diagram of an exemplary computer system formed with a processor that includes execution units to execute an instruction, where one or more of the interconnects implement one or more features in accordance with one embodiment of the present disclosure is illustrated. System 1100 includes a component, such as a processor 1102 to employ execution units including logic to perform algorithms for process data, in accordance with the present disclosure, such as in the embodiment described herein. System 1100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1102 includes one or more execution units 1108 to implement an algorithm that is to perform at least one instruction. One embodiment may be described in the context of a single processor desktop or server system, but alternative embodiments may be included in a multiprocessor system. System 1100 is an example of a 'hub' system architecture. The computer system 1100 includes a processor 1102 to process data signals. The processor 1102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1102 is coupled to a processor bus 1110 that transmits data signals between the processor 1102 and other components in the system 1100. The elements of system 1100 (e.g. graphics accelerator 1112, memory controller hub 1116, memory 1120, I/O controller hub 1140, wireless transceiver 1126, Flash BIOS 1128, Network controller 1134, Audio controller 1136, Serial expansion port 1138, I/O controller 1140, etc.) perform their conventional functions that are well known to those familiar with the art.

In one embodiment, the processor 1102 includes a Level 1 (L1) internal cache memory 1104. Depending on the architecture, the processor 1102 may have a single internal cache or multiple levels of internal caches. Other embodiments include a combination of both internal and external caches depending on the particular implementation and needs. Register file 1106 is to store different types of data in various registers including integer registers, floating point registers, vector registers, banked registers, shadow registers, checkpoint registers, status registers, and instruction pointer register.

Execution unit 1108, including logic to perform integer and floating point operations, also resides in the processor 1102. The processor 1102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1102. For one embodiment, execution unit 1108 includes logic to handle a packed instruction set 1109. By including the packed instruction set 1109 in the instruction set of a general-purpose processor 1102, along with associated circuitry to execute the instructions, the operations used by many multimedia applications may be performed using packed data in a general-purpose processor 1102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1108 may also be used in micro controllers, embedded processors, graphics devices, DSPs, and other types of logic circuits. System 1100 includes a memory 1120. Memory 1120 includes a dynamic random access memory (DRAM) device, a static random access memory (SRAM) device, flash memory device, or other memory device. Memory 1120 stores instructions and/or data represented by data signals that are to be executed by the processor 1102.

Note that any of the aforementioned features or aspects of the disclosure may be utilized on one or more interconnect illustrated in FIG. 11. For example, an on-die interconnect (ODI), which is not shown, for coupling internal units of processor 1102 implements one or more aspects of the disclosure described above. Or the disclosure is associated with a processor bus 1110 (e.g. Intel Quick Path Interconnect (QPI) or other known high performance computing interconnect), a high bandwidth memory path 1118 to memory 1120, a point-to-point link to graphics accelerator 1112 (e.g. a Peripheral Component Interconnect express (PCIe) compliant fabric), a controller hub interconnect 1122, an I/O or other interconnect (e.g. USB, PCI, PCIe) for coupling the other illustrated components. Some examples of such components include the audio controller 1136, firmware hub (flash BIOS) 1128, wireless transceiver 1126, data storage 1124, legacy I/O controller 1110 containing user input and keyboard interfaces 1142, a serial expansion port 1138 such as Universal Serial Bus (USB), and a network controller 1134. The data storage device 1124 can comprise a hard disk drive, a floppy disk drive, a CD-ROM device, a flash memory device, or other mass storage device.

Figure 12:
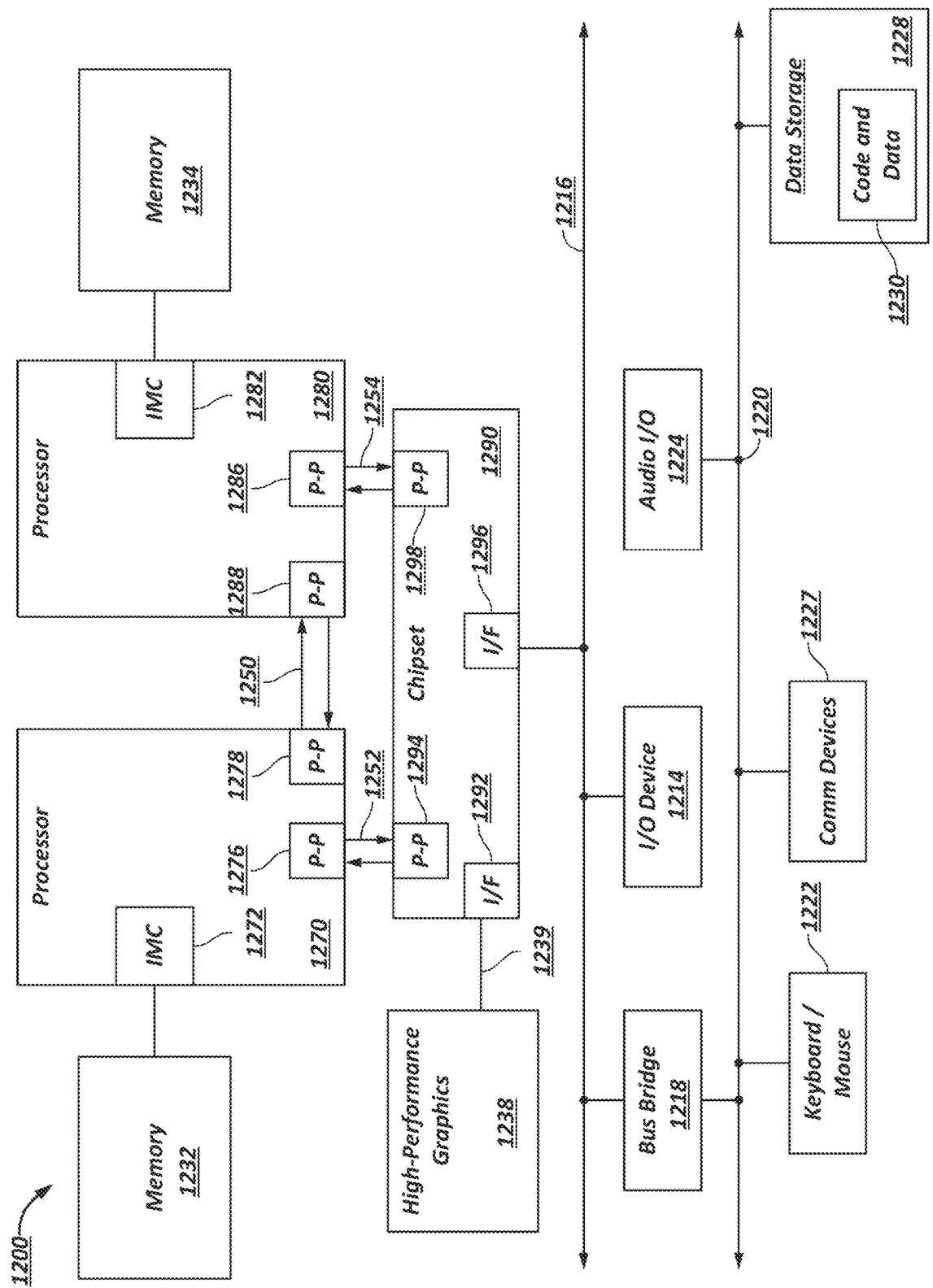
FIG. 12 illustrates an embodiment of a block for a computing system including multiple processor sockets.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off In such a platform, power management can be made to be transparent to applications and maintain constant connectivity, in part due to offload technology to enable the lowest powered component to perform an operation.

Various aspects and combinations of the embodiments are described above, some of which are represented by the following examples:

Example 1 is an apparatus comprising a first set of processing element nodes, the first set of processing element nodes defining a first hierarchy of processing element nodes, the first set of processing element nodes comprising a source node, a source look-up table (LUT), a first router, the first router to comprise a first forwarder node, and a first reflection LUT. The apparatus can include a second set of processing element nodes, the second set of processing element nodes defining a second hierarchy of processing element nodes, the second set of processing element nodes comprising a second router, the second router to comprise a second forwarder node, a target node; wherein the first reflection LUT is to comprise an address of the second forwarder node in the second hierarchy.

Example 2 may include the subject matter of example 1, wherein the first reflection LUT comprises a cardinal direction for the second forwarder node in the second hierarchy.

Example 3 may include the subject matter of any of examples 1-2, wherein the first forwarder node and the second forwarder node are to define a reflection network of routers, the reflection network of routers comprising the first forwarder node and the second forwarder node.

Example 4 may include the subject matter of any of examples 1-3, wherein the source node is logically coupled to the first forwarder node by a first virtual channel, and the first forwarder node is logically coupled to the second forwarder node by a second virtual channel.

Example 5 may include the subject matter of any of examples 1-4, the source LUT to comprise a mapping of addresses for the first set of processing element nodes.

Example 6 may include the subject matter of example 5, wherein the source LUT comprises a hashed value for destination addresses within the first hierarchy.

Example 7 may include the subject matter of example 5, wherein the source node is to identify the firs forwarder node for a packet from the indirection LUT, and forward the packet to the first forwarder node. The first forwarder node is to identify the second forwarder node and a cardinal direction of the second forwarder node from the first reflection LUT, and forward the packet to the second forwarder node.

Example 8 may include the subject matter of any of examples 1-7, further comprising a third set of processing element nodes, the third set of processing element nodes defining a third hierarchy of processing element nodes, the third set of processing element nodes comprising a third forwarder node logically coupled to the first forwarder node and the second forwarder node.

Example 9 may include the subject matter of example 8, the source node to forward a message to the first forwarder node by a first virtual channel; first forwarder node to identify a cardinal direction for the third router node from the first reflection LUT and to forward the message to the third router node by a second virtual channel; the third router node to identify a cardinal direction for the second forwarder node from a third reflection LUT and to forward the message to the second forwarder node by the second virtual channel; and the second forwarder node to identify the target node and to forward the message to the target node by the first virtual channel.

Example 10 is a method comprising receiving, at a first forwarder node from across a first virtual channel, a packet from a source node on a silicon substrate, the first forwarder node and the source node among a plurality of hardware elements within a first hierarchy of hardware elements; determining a second forwarder node based on a reflection look-up table (LUT) corresponding to the first forwarder node, the second forwarder node among a plurality of hardware elements within a second hierarchy of hardware elements; and forwarding the packet to the second forwarder node across a second virtual channel, the second virtual channel different from the first virtual channel.

Example 11. The method of claim 10, wherein determining the second forwarder node comprises identifying a cardinal direction for the second forwarder node from the reflection LUT based on information in a header of the packet.

Example 12 may include the subject matter of any of examples 10-11, wherein the packet comprises a packet header, the packet header comprising an actual target on-die interconnect (ODI) identification (ID) and an indirection ODI ID.

Example 13 may include the subject matter of example 12, wherein the actual target ODI ID and the indirection ODI ID comprise a hierarchy ID, a local column, and a local row.

Example 14 may include the subject matter of example 13, further comprising determining that the packet target node is in the second hierarchy based on the hierarchy ID in the actual target ODI ID.

Example 15 may include the subject matter of example 12, further comprising determining an indirection ID for a target node for the packet from an indirection LUT based on a hashed value of a packet header field.

Example 16 may include the subject matter of example 12, further comprising determining the second forwarder node from the reflection LUT based on a value of the hierarchy ID from the packet header.

Example 17 is a system comprising a semiconductor substrate comprising a first set of processing element nodes, the first set of processing element nodes defining a first hierarchy of processing element nodes, the first set of processing element nodes comprising a source node, a source look-up table (LUT), a first router, the first router to comprise a first forwarder node, and a first reflection LUT. The system can also include a second set of processing element nodes, the second set of processing element nodes defining a second hierarchy of processing element nodes, the second set of processing element nodes comprising a second router, the second router to comprise a second forwarder node, and a second reflection LUT. The system can include a third set of processing element nodes, the third set of processing element nodes defining a third hierarchy of processing element nodes, the third set of processing element nodes comprising a third forwarder node, and a target node. The first reflection LUT is to comprise an address of the second forwarder node in the second hierarchy, the first forwarder node to identify a cardinal direction for the second forwarder node from the first reflection LUT and to forward a message to the second forwarder node. The second reflection LUT is to comprise an address of the third forwarder node in the third hierarchy, the second forwarder node to identify a cardinal direction for the third forwarder node from the second reflection LUT and to forward a message to the third forwarder node. The third forwarder node is to forward the packet to the target node.

Example 18 may include the subject matter of example 17, wherein the first and second reflection LUTs comprise a direction and row and column entry for a reflected router node in a different hierarchy of processing element nodes.

Example 19 may include the subject matter of any of examples 17-18, wherein the first hierarchy of processing element nodes comprises a plurality of memory controllers and wherein the second hierarchy of processing element nodes comprises a plurality of memory elements.

Example 20 may include the subject matter of any of examples 17-19, wherein the first forwarder node is to communicate with the second forwarder node by a second virtual channel.

What is claimed is:
1. An apparatus comprising:
a first set of processing element nodes arranged in at least two columns and at least two rows, the first set of processing element nodes defining a first hierarchy of processing element nodes, the first set of processing element nodes comprising:
a source node,
a source look-up table (LUT),
a first router, the first router to comprise a first forwarder node, and
a first reflection LUT; and
a second set of processing element nodes arranged in at least two columns and at least two rows, the second set of processing element nodes defining a second hierarchy of processing element nodes, the second set of processing element nodes comprising:
a second router, the second router to comprise a second forwarder node,
a target node;
wherein the first reflection LUT is to comprise an address of the second forwarder node in the second hierarchy,
wherein, for a packet from the source node to the target node, (i) the source node is to route the packet to the first forwarder node with use of dimension order routing (DOR) within the first set of processing element nodes, (ii) the first forwarder node is to route the packet to the second forwarder node with use of DOR within a plurality of forwarder nodes, the plurality of forwarder nodes comprising the first forwarder node and the second forwarder node, wherein each of the forwarder nodes of the plurality of forwarder nodes resides in its own hierarchy, and (iii) the second for- warder node is to route the packet to the target node with use of DOR within the second set of processing element nodes.

2. The apparatus of claim 1, wherein the first reflection LUT comprises a cardinal direction for the second forwarder node in the second hierarchy.

3. The apparatus of claim 1, wherein the first forwarder node and the second forwarder node are to define a reflection network of routers, the reflection network of routers comprising the first forwarder node and the second forwarder node.

4. The apparatus of claim 1, wherein the source node is logically coupled to the first forwarder node by a first virtual channel, and the first forwarder node is logically coupled to the second forwarder node by a second virtual channel.

5. The apparatus of claim 1, the source LUT to comprise a mapping of addresses for the first set of processing element nodes.

6. The apparatus of claim 5, wherein the source LUT comprises a hashed value for destination addresses within the first hierarchy.

7. The apparatus of claim 5, wherein:
the source node is to:
identify the first forwarder node for the packet from the source LUT, wherein the source LUT is an indirection LUT, and
forward the packet to the first forwarder node;
the first forwarder node is to:
identify the second forwarder node and a cardinal direction of the second forwarder node from the first reflection LUT, and
forward the packet to the second forwarder node.

8. The apparatus of claim 1, further comprising:
a third set of processing element nodes, the third set of processing element nodes defining a third hierarchy of processing element nodes, the third set of processing element nodes comprising:
a third router, the third router to comprise a third forwarder node logically coupled to the first forwarder node and the second forwarder node.

9. The apparatus of claim 8, the source node to forward a message to the first forwarder node by a first virtual channel;
the first forwarder node to identify a cardinal direction for the third forwarder node from the first reflection LUT and to forward the message to the third forwarder node by a second virtual channel;
the third forwarder node to identify a cardinal direction for the second forwarder node from a third reflection LUT and to forward the message to the second forwarder node by the second virtual channel; and
the second forwarder node to identify the target node and to forward the message to the target node by the first virtual channel.

10. The apparatus of claim 1, further comprising a semiconductor substrate, the semiconductor substrate comprising the first set of processing element nodes and the second set of processing element nodes,
wherein the second set of processing element nodes comprises a second reflection LUT,
wherein the semiconductor substrate further comprises a third set of processing element nodes, the third set of processing element nodes defining a third hierarchy of processing element nodes, the third set of processing element nodes comprising:
a third forwarder node, and
a second target node;
wherein the first forwarder node to identify a cardinal direction for the second forwarder node from the first reflection LUT and to forward a message to the second forwarder node;
wherein the second reflection LUT is to comprise an address of the third forwarder node in the third hierarchy, the second forwarder node to identify a cardinal direction for the third forwarder node from the second reflection LUT and to forward a message to the third forwarder node; and
wherein the third forwarder node is to forward the packet to the second target node.

11. A method comprising:
receiving, at a first forwarder node from across a first virtual channel, a packet from a source node on a silicon substrate, the first forwarder node and the source node among a plurality of hardware elements within a first hierarchy of hardware elements, the first hierarchy of hardware elements arranged in at least two columns and at least two rows, wherein the packet is routed from the source node to the first forwarder node using dimension order routing (DOR) within the first hierarchy of hardware elements;
determining a second forwarder node based on a reflection look-up table (LUT) corresponding to the first forwarder node, the second forwarder node among a plurality of hardware elements within a second hierarchy of hardware elements, the second hierarchy of hardware elements arranged in at least two columns and at least two rows,; and
forwarding the packet to the second forwarder node across a second virtual channel, the second virtual channel different from the first virtual channel, wherein the packet is routed from the first forwarder node to the second forwarder node using DOR within a plurality of forwarder nodes, the plurality of forwarder nodes comprising the first forwarder node and the second forwarder node, wherein each of the forwarder nodes of the plurality of forwarder nodes resides in its own hierarchy.

12. The method of claim 11, wherein determining the second forwarder node comprises identifying a cardinal direction for the second forwarder node from the reflection LUT based on information in a header of the packet.

13. The method of claim 11, wherein the packet comprises a packet header, the packet header comprising an actual target on-die interconnect (ODI) identification (ID) and an indirection ODI ID.

14. The method of claim 13, wherein the actual target ODI ID and the indirection ODI ID comprise a hierarchy ID, a local column, and a local row.

15. The method of claim 14, further comprising:
determining that a target node of the packet is in the second hierarchy based on the hierarchy ID in the actual target ODI ID.

16. The method of claim 13, further comprising:
determining the second forwarder node from the reflection LUT based on a value of a hierarchy ID from the packet header.

17. A system comprising:
a semiconductor substrate comprising:
a first set of processing element nodes arranged in at least two columns and at least two rows, the first set of processing element nodes defining a first hierarchy of processing element nodes, the first set of processing element nodes comprising:
a source node,
a source look-up table (LUT),
a first router, the first router to comprise a first forwarder node, and
a first reflection LUT;
a second set of processing element nodes arranged in at least two columns and at least two rows, the second set of processing element nodes defining a second hierarchy of processing element nodes, the second set of processing element nodes comprising:
a second router, the second router to comprise a second forwarder node, and
a second reflection LUT; and
a third set of processing element nodes arranged in at least two columns and at least two rows, the third set of processing element nodes defining a third hierarchy of processing element nodes, the third set of processing element nodes comprising:
a third forwarder node, and
a target node;
wherein the first reflection LUT is to comprise an address of the second forwarder node in the second hierarchy, the first forwarder node to identify a cardinal direction for the second forwarder node from the first reflection LUT and to forward a message to the second forwarder node;
wherein the second reflection LUT is to comprise an address of the third forwarder node in the third hierarchy, the second forwarder node to identify a cardinal direction for the third forwarder node from the second reflection LUT and to forward a message to the third forwarder node; and
wherein the third forwarder node is to forward a packet to the target node.

18. The system of claim 17, wherein the first and second reflection LUTs comprise a direction and row and column entry for a reflected router node in a different hierarchy of processing element nodes.

19. The system of claim 17, wherein the first hierarchy of processing element nodes comprises a plurality of memory controllers and wherein the second hierarchy of processing element nodes comprises a plurality of memory elements.

20. The system of claim 17, wherein the first forwarder node is to communicate with the second forwarder node by a second virtual channel.

* * * * *